(12) United States Patent
Chen et al.

(10) Patent No.: US 9,342,573 B2
(45) Date of Patent: May 17, 2016

(54) UNIVERSAL DELTA DATA LOAD

(71) Applicant: SAP AG, Walldorf (DE)

(72) Inventors: Yingyu Chen, Shanghai (CN); Han Li, Shanghai (CN); Yihan Song, Shanghai (CN)

(73) Assignee: SAP SE, Walldorf (DE)

( * ) Notice: Subject to any disclaimer, the term of this patent is extended or adjusted under 35 U.S.C. 154(b) by 347 days.

(21) Appl. No.: 13/894,377

(22) Filed: May 14, 2013

(65) Prior Publication Data

US 2014/0330780 A1    Nov. 6, 2014

(30) Foreign Application Priority Data

May 6, 2013   (CN) .......................... 2013 1 0163041

(51) Int. Cl.
*G06F 7/00*     (2006.01)
*G06F 17/00*    (2006.01)
*G06F 17/30*    (2006.01)

(52) U.S. Cl.
CPC ................................ *G06F 17/30575* (2013.01)

(58) Field of Classification Search
CPC .................. G06F 17/30174; G06F 17/30289; G06F 17/30386; G06F 17/30554; G06F 17/30592; G06F 17/30575; G06F 17/30563
USPC .......................................... 707/602, 625, 635
See application file for complete search history.

(56) References Cited

U.S. PATENT DOCUMENTS

| | | | |
|---|---|---|---|
| 6,125,371 A | 9/2000 | Bohannon et al. | |
| 6,665,654 B2 | 12/2003 | Broden et al. | |
| 6,847,971 B1 * | 1/2005 | Balaraman et al. | |
| 6,941,327 B2 | 9/2005 | Kim et al. | |
| 7,099,898 B1 | 8/2006 | Nakamura et al. | |
| 7,305,421 B2 | 12/2007 | Cha et al. | |
| 7,346,628 B2 | 3/2008 | Porter | |
| 7,415,458 B2 | 8/2008 | Sauermann | |
| 7,481,368 B2 * | 1/2009 | Wang et al. | 235/385 |
| 7,725,434 B2 | 5/2010 | Boggs | |
| 8,412,690 B2 | 4/2013 | Hermann et al. | |
| 2002/0174142 A1 * | 11/2002 | Demers et al. | 707/509 |
| 2004/0010502 A1 | 1/2004 | Bomfim et al. | |
| 2004/0267776 A1 | 12/2004 | Brown et al. | |
| 2007/0239508 A1 * | 10/2007 | Fazal et al. | 705/8 |
| 2007/0239769 A1 * | 10/2007 | Fazal et al. | 707/102 |
| 2009/0013259 A1 * | 1/2009 | Teichman | 715/738 |
| 2009/0187573 A1 * | 7/2009 | Johnston et al. | 707/10 |
| 2011/0258225 A1 * | 10/2011 | Taylor et al. | 707/769 |
| 2012/0221528 A1 | 8/2012 | Renkes et al. | |
| 2012/0265728 A1 | 10/2012 | Plattner et al. | |
| 2012/0310934 A1 | 12/2012 | Peh et al. | |
| 2013/0006931 A1 | 1/2013 | Nelke et al. | |

* cited by examiner

*Primary Examiner* — Susan Chen
(74) *Attorney, Agent, or Firm* — Horizon IP Pte. Ltd.

(57) ABSTRACT

Described herein is a technology for facilitating delta data load. In some implementations, history tables corresponding to physical tables in a data source are provided in a database layer. The database layer includes change list tables corresponding to the history tables and a physical data model based on one or more physical tables. Delta data is determined by analyzing the change list table to create delta data summary tables. Key lists are generated for summary tables corresponding to physical tables which physical data is based. The delta data is applied to the physical data model.

19 Claims, 6 Drawing Sheets

```
SQL  Result
  SELECT * FROM HIS_ROT
```

|    | VALIDFROM | VALIDTO | MANDT | DB_KEY |
|----|-----------|---------|-------|--------|
| 1  | 870,784   | 870,788 | 001   | 01     |
| 2  | 870,785   | 870,788 | 001   | 02     |
| 3  | 870,786   | 870,789 | 001   | 03     |
| 4  | 870,787   | 870,789 | 001   | 04     |
| 5  | 870,788   | 870,791 | 001   | 01     |
| 6  | 870,788   | 870,790 | 001   | 02     |
| 7  | 870,789   | 870,792 | 001   | 03     |
| 8  | 870,789   | 870,790 | 001   | 04     |
| 9  | 870,790   | ?       | 001   | 02     |
| 10 | 870,790   | ?       | 001   | 04     |
| 11 | 870,791   | ?       | 001   | 01     |

UNIVERSAL DELTA DATA LOAD

TECHNICAL FIELD

The present disclosure relates generally to database systems. More particularly, the present disclosure relates to delta data load in database systems.

BACKGROUND

In today's business environment, huge amount of data may be generated. Such data may be stored in a database and managed by database system. The data may be stored in, for example, tables. The data may relate to, for example, employees, customers and customer orders. The data may be processed, as desired, to provide the desired information related to the data in the database. Such processing, for example, may provide analytics, such as statistical information as well as generating reports.

Data in the tables may be constantly changing or generated. For example, in transaction processing system, numerous transactions may occur in a day. The changes or new data (delta data) in the tables need to be loaded into the database. However, conventional databases do not provide for a delta data load function. This is because different businesses may have different types of tables or files, making it difficult to provide a delta data load solution by database providers for all the different users.

To update the database, full data loads are typically performed. For example, all data from the tables are loaded into the database. Due to the large amount of data, full data loads may require a tremendous amount of time. As such, full data loads are infrequently performed. Consequently, processing of data in the database may not reflect the latest data, resulting in inaccurate information.

Thus, a need exists for systems, methods, and apparatuses to effectively perform delta data loads in databases.

SUMMARY

A computer-implemented method for facilitating delta data load is described herein. The method includes replicating physical tables from a data source to form replicated physical tables. The method also includes converting replicated physical tables to history tables. The history tables log changes to the physical tables. The method also includes providing a physical data model. The physical data model is based on at least one physical table. The method also includes generating change list tables corresponding to the history tables. The change list tables contain changes of the corresponding history tables since a last delta data load when a data load is initiated. The method further includes updating changes since the last delta data load in the physical data model.

In one embodiment, a non-transitory computer-readable medium having stored thereon program code is disclosed. The program code is executable by a computer to generate change list tables from history tables which correspond to physical tables from a data source when a delta load is initiated. The program code is also executable by the computer to analyze the change list table to form delta data summary tables from the change list tables. The program code is also executable by the computer to generate key list corresponding to delta data and apply delta data based on the generated key list to a physical data model. The physical data model is based on one or more physical tables from the data source.

In yet another embodiment, a system is disclosed. The system includes a raw data schema. The raw data schema contains history tables. The history tables contain change log history of data tables of a user system. The system also includes a log data schema. The log data schema is configured to contain change list tables. The change list tables contain changes of the history tables since a last delta data load. The system also includes a physical data model schema. The physical data model schema contains at least one physical data model based on at least some of the data tables of the user system. Delta data since the last delta data load is loaded into the physical data model.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

The present framework as described herein may include systems, methods, and apparatuses for facilitating delta data loading of a database. The present framework may be provided in a software environment. For example, the framework may facilitate delta data loading of a database or databases in the environment. The environment may have a client/server (C/S) architecture. For example, the environment may be a distributed C/S architecture. Other types of environments may also be useful. For example, the environment may be a cloud computing environment.

The environment includes one or more servers communicatively coupled via a communication network. The communication network, for example, may be a local area network (LAN) which interconnects different devices, such as the clients and server. Other types of networks may also be useful. The devices may be coupled via the network by wireless and/or wired connections.

A server, in one embodiment, may be a computer which includes a memory and a processor. The server is configured to transmit, receive, process and store information or data associated with the environment. Various types of computers may be employed. For example, the computer may be a mainframe, workstation, as well as other types of processing devices. The server may be adapted to execute any operating system. For example, the operating system of the server may be z/OS, Linux-Intel, Linux/390, UNIX, or Windows Server. Other types of operating systems may also be used. The server may also include or be communicatively coupled with a web server and/or a Simple Mail Transfer Protocol (SMTP) server.

The memory of the server may include any non-transitory memory or database module. The memory may be volatile or non-volatile types of memories, such as magnetic media, optical media, random access memory (RAM), read-only memory (ROM), removable media, or any other suitable local or remote memory component.

Clients are communicatively coupled to the network to communicate with the server. Furthermore, the server may facilitate communication between clients. A client, for example, may be a desktop or a laptop computer. Other types of computing devices may also be useful to serve as a client, such as a smart phone or a tablet computer. A client may be directly coupled to the communication network. Additionally, a client may be indirectly coupled to the communication network by one or more external communication networks. External communication networks may be considered as wide area networks (WANs). External communication networks may include the internet, mobile communication networks, such as a 3G or 4G networks or a combination thereof. Other types of client devices or configuration of communication networks may also be useful.

Software applications may be provided in the environment. The software applications may be user applications, including business or enterprise applications. The user applications may generate data files or files based on the data files. The files, for example, are managed by a database management system. Other types of user applications may also be useful. The user applications may be part of or form the user system. The user applications, for example, may be C/S applications. Generally, C/S applications include frontend and backend portions. The frontend portions are stored locally on the clients while the backend portions are located in the server or serves.

A client may include a user interface for a user to interface with the environment for various purposes. For example, the interface may be used to access various applications in the environment. The user interface may also serve other purposes. In one embodiment, the user interface includes a graphical user interface (GUI). A GUI may provide an efficient and user-friendly manner of presenting information or communicating with the environment. For example, a GUI may include a task menu as well as one or more panes for displaying information. Other types of user interfaces, such as command line interface (CLI), may also be useful. The type of user interface may depend on the type of application running on the client. For example, the frontend portion may include a GUI to enable a user to interact with the backend portion to access data stored in the server.

Figure 1:
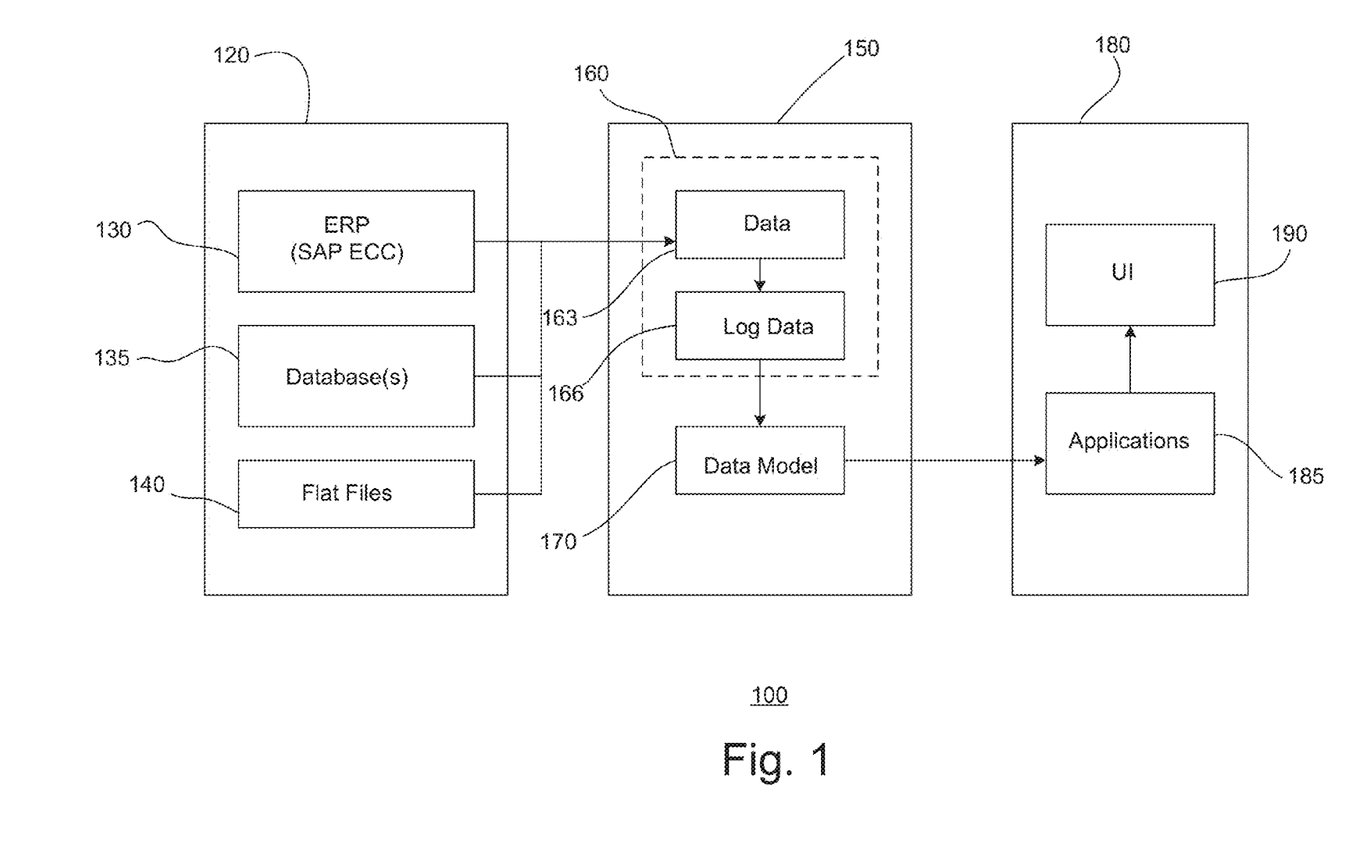
FIG. 1 is a simplified block diagram showing an embodiment of a software architecture.

FIG. 1 shows a block diagram of an embodiment of a software architecture 100. In one embodiment, the architecture includes first, second and third layers 120, 150 and 180. In one embodiment, the first layer is a user systems layer, the second layer is a database layer and the third layer is an application layer. Providing a software architecture with additional or other layers may also be useful.

The user systems layer, in one embodiment, includes a user software system 130. The user software system generates files which are stored in, for example, a database. The files, for example, may be data files or other types of files. The user software system may be a business or enterprise software system. The user software systems, for example, may be an enterprise resource planning (ERP) software system. In one embodiment, the ERP software may be a SAP Enterprise Central Component (SAP ECC) software system. Other types of ERP or software systems may also be useful. For example, the system may be an SQL server, Oracle or other file systems. The user systems layer may include alternative or additional software systems or other types of components. For example, the user systems layer may include one or more other databases 135. Other types of components which may be included may be flat files 140. Providing the user systems layer with other configurations may also be useful. The component or components of the user systems layer may be considered legacy systems.

As discussed, the user systems layer may include one or more databases. A database may be composed of data files. The data files are in the form of one or more physical data tables. For example, a database may include one or more physical data tables. A table is a compilation of records, with a record having data and a primary key which is a unique record identifier. The tables may be referred to as source tables having source records with source data and associated primary keys. Additionally, data files may include flat files. The databases may be collectively considered as one database with source tables. Other configurations may also be useful. As for the database layer, it includes a database management system. The user systems layer serves as a data source for the database layer. For example, the physical tables and flat files in the user systems layer serve as source data for the database management system. Flat files in the user systems layer are converted to tables by the database management system. The database management system, in one embodiment, is a HANA database management system from SAP. Other types of database management systems may also be useful.

In one embodiment, the database management system includes a delta data load (DDL) module 160. The DDL facilitates uploading of delta data to a physical data model (PDM) module 170. The PDM contains physical data models. A physical data model, for example, is based on the physical tables. A delta data load controller (now shown) in the database layer, when initiates, identities delta data in the DDL and loads the delta data in the PDM.

The application layer includes an applications module 185. The applications module, for example, includes applications. The applications may include various types of applications which use or consume the data. Applications, for example, may be mass data processing applications, such as reports/ stats applications. Other types of applications may also be useful. In one embodiment, the applications use data in the physical data model module in the database layer. The data may be accessed using, for example, a user interface module 190. The user interface module facilitates access to the data to build a data presentation layer.

The database layer will be discussed in greater detail. The database layer includes various schemas for storing different tables. The tables of the different schemas are used for different purposes. For example, the table of the schemas is used for different purposes to facilitate identifying delta data and loading of the delta data in the physical data model module.

The DDL module, in one embodiment, includes first and second schemas for storing different tables. The first schema is a raw data schema (RDS) 163 and the second schema is a log data schema (LDS) 166. Providing other schemas for the DDL module may also be useful.

The RDS sub-module contains history tables. The history tables, for example, are history column tables. Other types of history tables may also be useful. The history tables in the RDS sub-module have a one-to-one correspondence with the source tables in the user systems layer. The history tables are derived from the source tables in the user systems layer. For examples, history tables are replicated from source tables and converted to history tables. In one embodiment, the history tables have the same structure as the source tables. For example, records of the history tables include a primary key and source data corresponding to the records of the source tables. Records in the history tables may be referred to as history records.

In the case where data files include flat files, they are converted to tables using a data service. The tables are converted to history tables, similarly as the replicated source tables. Source table replication and flat file conversion to table may be performed by different types of data services. Other configurations of data services for providing history tables in the RDS sub-module may also be useful.

In one embodiment, the history tables include change tracking functionality. For example, history tables track or log changes to their corresponding source tables. In other words, the history tables keep the change history of the source tables. Any change in the source table is realized in the history table. For example, the history table indicates what changes were made and when those changes were made. For example, a change in a source record causes a new history record to be created in the history table corresponding to the source table of the changed source record. History records may be considered change logs of the source tables.

In one embodiment, conversion of the source tables to history tables includes providing "valid from" and "valid to" attributes to facilitate change tracking. The "valid from" attribute contains the commit id of when its corresponding history record was entered into a history table; the "valid to" attribute contains the commit id of when the corresponding history record is no longer valid. A null value in the 'valid to' attribute indicates that the history record is still valid. The "valid from" and "valid to" attributes facilitate in determining the delta data from the previous delta data load. The commit id is equivalent to a time stamp. A commit id which is greater than another indicates that it occurred later in time, while a lesser one indicates that it occurred earlier in time.

Data services may be employed to replicate the source tables from the user systems layer in the RDS sub-module. For example, SAP Landscape Transformation (SLT) software may be used to replicate data into the RDS sub-module. Other types of data services or software may also be useful. For example, Java programming or data services may be used to replicate data. Once the source tables are replicated, they are converted to history tables in the RDS sub-module. For example, the replicated source tables are converted to history tables in a HANA database. Converting or modifying the replicated source tables into history tables in other types of databases may also be useful.

The data replication may be employed to continuously update the history tables in the RDS sub-module based on changes to the physical tables in the user systems layer. For example, changes to the source tables are permeated to the history tables. As such, the history tables contain history records, logging all changes to the source tables. A source record may have multiple entries or history records, each corresponding to a change to the source record over time.

As for the LDS sub-module, it maintains change list tables. In one embodiment, a history table has a corresponding change list table. For example, x history tables in the RDS sub-module result in x change list tables in the LDS sub-module, with the $i^{th}$ change list table corresponding to the $i^{th}$ history table. The change list tables contain information of changes of the source tables since the last delta data load or commit. For example, a change list table contains change logs of its corresponding history table. The change logs, for example, are the history records corresponding to changes to the source tables since the last commit. In one embodiment, the change list table contains the change history since the last commit. The commit id corresponding to the last commit or delta data load is stored in, for example, a configuration file. Storing the commit id in other locations may also be useful. For example, the commit id may be stored in a table. The change list tables are cleared or refreshed after a delta data load. For example, change list tables are created with each delta data load request or when a delta data load is initiated.

By providing a database layer, new applications can use data of the user systems layer or legacy systems with no impact on them. Furthermore, providing separate schemas in the database layer improves flexibility and performance. For example, the different schemas in the database layer facilitate maintainability and expandability.

The PDM module provides a schema for storing physical data models of the application layer. The physical data models, for example, reflect the business needs or model of the user. The physical data model is based on the physical tables in the user systems layer. In one embodiment, a physical data model may be based on one or more tables. For example, a physical data model includes x tables, where x is ≥1. Typically, x is >1. Tables of a model may be referred to as a target table. For example, a target table may be a composition of multiple physical tables or a physical table. Other configurations of target tables may also be useful.

Figure 2:
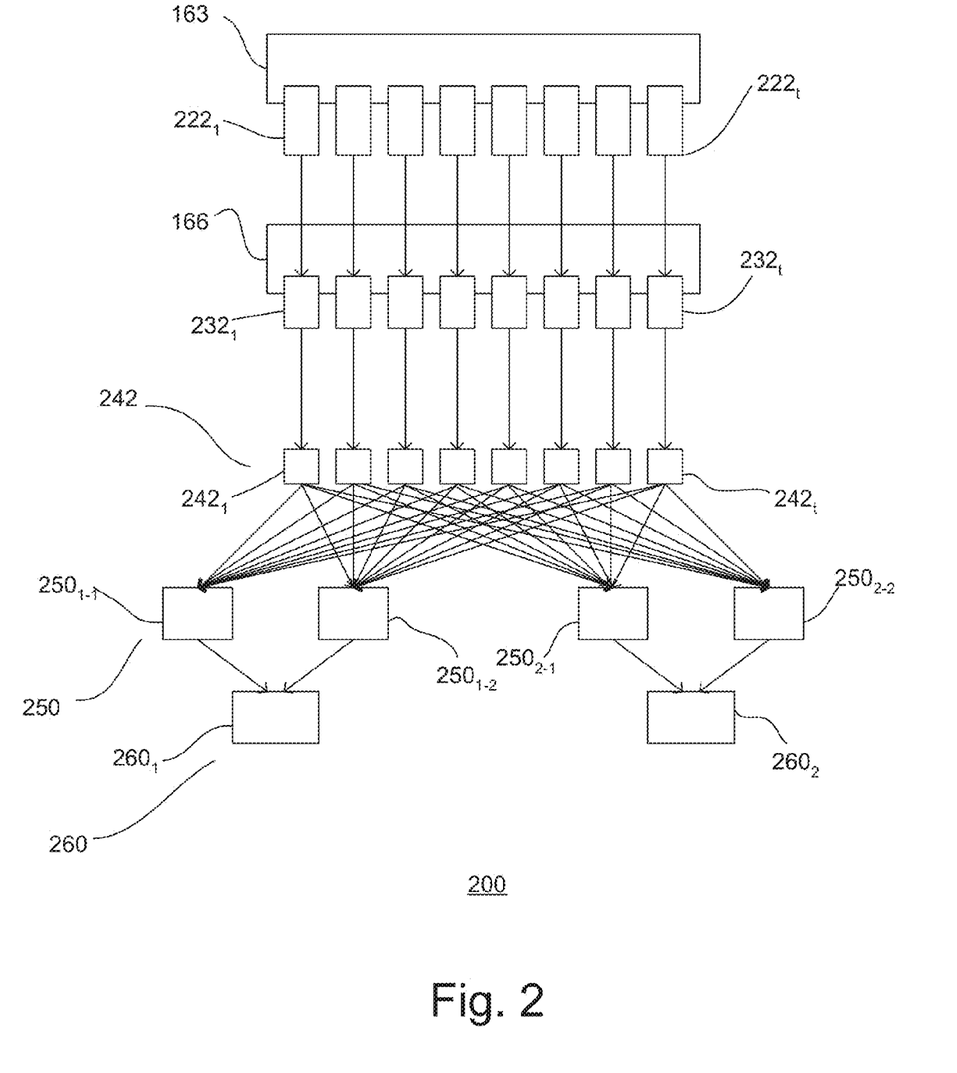
FIG. 2 shows an embodiment of delta data load process.

FIG. 2 illustrates an embodiment of a delta data load process 200. As shown, t history tables are provided in the RDS sub-module 163. For example, the RDS sub-module includes history tables $221_1$-$222_t$. The history tables, for example, are history column tables. Other types of history tables may also be useful.

When the database layer is initialized, history tables are created. In one embodiment, history tables are created by replicating the source tables in the user systems layer. For example, the user systems layer includes t source tables which are replicated in the RDS sub-module. Replicating the source tables in the RDS sub-module may be achieved by, for example, a data service, such as SLT. Other types of data services may also be useful. The replicated source tables are converted into history tables. For example, the replicated source tables are converted into history tables in the HANA database. Providing history tables in other types of databases may also be useful.

In one embodiment, records in the history tables include "valid from" and "valid to" attributes in addition to those of the source records. The "valid from" attribute indicates when the record was committed to the RDS sub-module. For example, the "valid from" attribute contains the commit id indicating when the record was committed to the RDS sub-module. As for the "valid to" attribute, it includes the commit id of when the record is changed. A change may include modifying source data or deleting of the record.

At initialization, all history records have the same values for "valid from" and "valid to" attributes. For example, all commit ids for the "valid from" attribute is equal to when the database was initialized while the "valid to" attribute is null. The commit id for the "valid to" attribute may be stored, for example, in a configuration file or a table. The commit id serves as the commit id of the last delta data load.

Also, when the database layer is initialized, change list tables $232_1$-$232_t$ are created in the LDS sub-module 166. In one embodiment, change list tables corresponding to the history tables are created one at a time. The following is an example of a create code snippet or routine for creating a change list table:

```
CREATE COLUMN TABLE "HIS_TABLE_x" (
    DB_KEY NVARCHAR(50),
    MANDT NVARCHAR(3),
    VALID_FROM BIGINT,
    VALID_TO BIGINT
);
```

The various components of the change list table are defined. For example, the primary key and "valid to" and "valid from" attributes are defined. As shown, the primary key may include fields DB_KEY and MANDT. A primary key may include one or multiple fields. In this case, the primary key includes 2 fields. The create routine is repeated until all change list tables corresponding to all history tables are created. For example, history tables are called TABLEs and there are TABLE_1 to TABLE_t in the RDS sub-module. Change list tables are called HIS_TABLEs. The create routine is used to create HIS_TABLE_1 to HIS_TABLE_t in the LDS sub-module corresponding to TABLE_1 to TABLE_t.

Delta data load may be programmed at regular intervals. For example, delta data load may be performed daily, weekly or monthly. Other interval granularity may also be useful. Additionally or alternatively, delta data load may be initiated on ad hoc basis. Also, at initialization of the database layer, the LDS sub-module is empty. For example, the LDS sub-module contains no change list tables.

As changes are made to the source tables, the changes are updated to the history tables. Updating of the changes may be performed by, for example, a data service, such as SLT. Other types of data services may also be useful. Different data services may be employed. For example, different data services may be employed for updating history tables corresponding to source tables and for updating history tables corresponding to flat files. Other configurations of data services for updating history tables may also be useful. Updating includes creating a new history record in the appropriate history table. When a source record is changed and updated in the history table, the commit id of the update is provided in the new history record in the "valid from" attribute as well as the "valid to" attribute of the existing history record corresponding to the source record. Between delta data loads, a source record may be changed multiple times. In such case, a history record will be created corresponding to each change in the history table corresponding to the source table containing the source record. During a delta data load, updating of the history tables is suspended. This effectively results in a snap shot of the source tables between delta data loads. Updating continues after delta data load is completed.

When a delta data load is initiated, change list tables are cleared and updated with changed information since the last delta data load. Updating of the history tables is suspended until, for example, completion of the current delta data load. In one embodiment, the change list table is updated with history records which have been Updating of the change list tables includes providing the records in the history table created after or are valid since the last delta data load. This includes records in which the "valid to" attribute is null. For example, records which have a "valid to" or a "valid from" attribute having a commit id that is the commit id of the last delta data load as well as "valid to" attribute=null. An example of a change list table update (or change list table data provision) code snippet or routine is provided below:

```
TRUNCATE TABLE "HIS_TABLE_x";
INSERT INTO HIS_TABLE_x"
SELECT "$validfrom$", "$validto$", MANDT, DB_KEY FROM "TABLE_x"
WHERE "$validfrom$" > 690662 OR "$validto$" > 690662
WITH PARAMETERS ('REQUEST_FLAGS' = ('ALLCOMMITTED', 'HISTORYNEEDVALIDTO'));
```

As shown, the change list table is truncated or cleared. New records that are changed in the history table are inserted into the change list table. The commit id for the last delta data load, for example, is 690662. The update routine is repeated until all change list tables have been updated.

After the change list tables are updated, they are analyzed to create delta data summary tables. The delta data summary tables, for example, may be part of the LDS sub-module. A delta data summary table has a corresponding change list table, which corresponds to the history tables. For example, delta data summary tables $242_1$-$242_t$ are created which correspond to change list tables $232_1$-$232_t$. A delta data summary table includes records which summarizes the delta data of its corresponding change list table. This in turn, identifies the delta data of the corresponding source table since the last delta data load. In one embodiment, the delta data summary tables are created one at a time. Other techniques for creating the delta data summary tables may also be useful.

In one embodiment, the change list tables are analyzed to create delta data summary tables. In one embodiment, the remaining records in the change list table are categorized in three categories. The categories include delete (D), update (U) and insert (I). The categories are based on the "value from" and "value to" attributes of a record. Records having a "valid from" value greater than that of the last delta data load and a non-null value for "valid to" attribute which is greater than the "valid from" attribute are categorized as deleted records. For records having a "valid to" value=null and "valid from" is ≤ last delta data load, the records are categorized as U records; records having a "valid to" value=null and "valid from" is > last delta data load, the records are categorized as I records. Records in the D category are deleted, records in the U category are changed and records in the I category are inserted or created.

After creating the delta data summary tables, the process continues to generate key lists 250 for the data models. As discussed, the PDM module contains y data models, where y is ≥1. A data model may include or be based on multiple source tables, represented by the history tables in the RDS sub-module. However, it is understood that primary keys of the data model need not be from all the source tables which the data model is based. For example, if the data model is based on three tables, the primary keys of the data model may be from two of the three tables. Other configurations of data model and source tables may also be useful. The PDM may include data models $260_{1-y}$. As shown, the PDM module includes first and second data models $260_{1-2}$ (e.g., y=2). Providing other number of data models may also be useful. A data model, for example, is in the form of a target table.

The key lists determine the delta data for the delta data load. A key list is a collection of physical data model changes. For example, a key list is a collection of changes to a target table. In one embodiment, z key lists are generated for a data model. In one embodiment, first and second key lists are generated for a data model (e.g., z=2). Generating other numbers of key lists for a data model may also be useful. The first key list is an upsert key list and the second key list is a delete key list. Key lists $250y\text{-}z$ are provided for the data model, where y correspond to the data model and z corresponds to the sub-key list. For example, a first upsert key list $250_{1\text{-}1}$ and a first delete key list $250_{1\text{-}2}$ are generated for the first data model; a second upsert key list $250_{2\text{-}1}$ and a second delete key list $250_{2\text{-}2}$ are generated for the second data model, An upsert key list includes keys of I and U categories of delta items from the delta data summary tables corresponding to tables of the corresponding data model. For example, in the case where the first data model is based on first, second and third source tables which correspond to the first, second and third history tables $222_{1\text{-}3}$, delta items in the first, second and third delta data summary tables $242_{1\text{-}3}$ are included in the first upsert key list. The keys of I and U delta items are mapped to the keys of the corresponding data model. For example, keys from the relevant delta data summary tables are mapped to the keys of the first data model to form the final upsert key list. In one embodiment, the mapping is a union of the keys in the relevant delta data summary tables to avoid duplications in the mapping.

As an example, a data model uses three tables, TA (PRIMARY KEY (A1, A2)), TB (PRIMARY KEY (B1, B2)) and TC (PRIMARY KEY (C1, C2)) and the keys of the model (A1, B2) are from TA and TB. In such case, the upsert key of TA (A1, A2) is mapped to the keys of model (A1, B2). Likewise, the upsert key of TB and TC are mapped to the keys of the model.

Additionally, some records may not satisfy the join condition. For example, some records may be filtered out after being updated. The records may be flagged as an exception and are subsequently deleted.

As for a delete key list, it includes keys of D category of delta items from the delta data summary tables corresponding to the data model. In one embodiment, the delete key list includes keys of D category of delta items from delta data summary tables which contribute keys to the data model. In the example where first and second source tables contribute primary keys to the data model but not the third source table, keys of D category of delta items from the first and second delta data summary tables are used to form the final delete key list. In one embodiment, the final delete key list is a union of the keys from the relevant delta data summary tables to avoid duplications.

Delta data is applied to target tables based on the key lists. For example, delta data is applied to the first target table based on the first upsert and delete key lists while the second target table is based on the second upsert and delete key lists.

Figure 3:
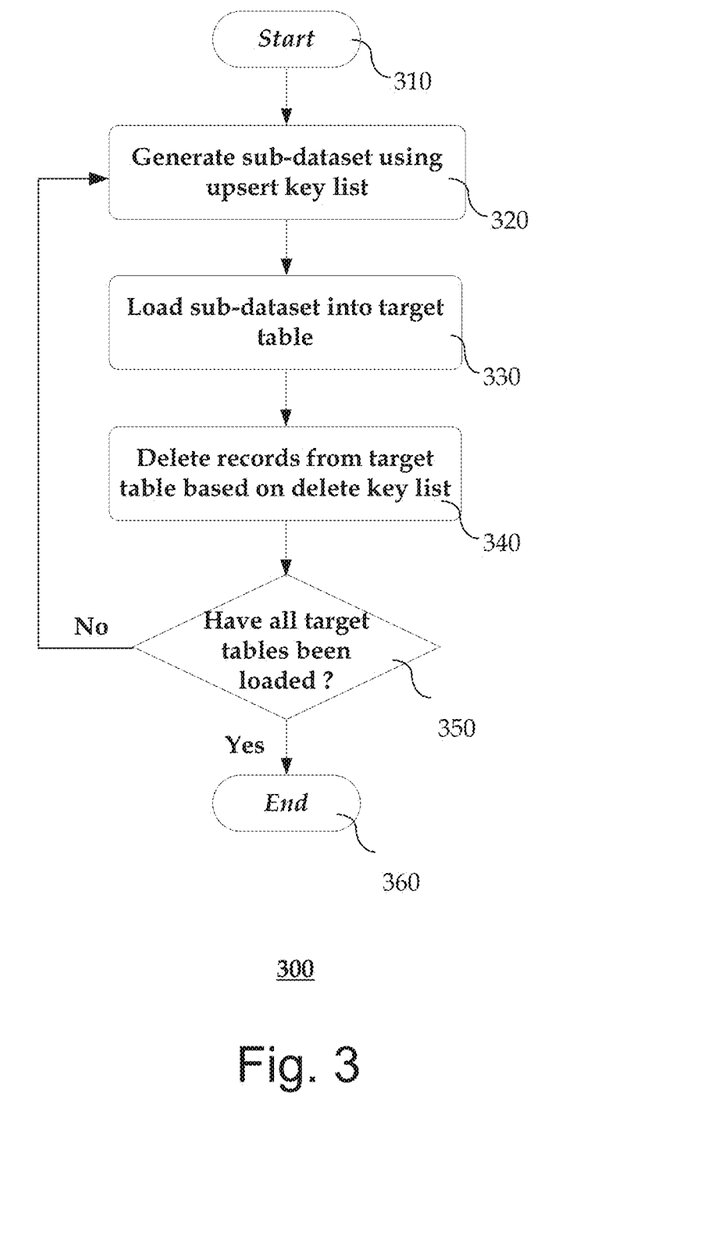
FIG. 3 shows an embodiment of a delta data load into a target table.

FIG. 3 shows an embodiment of a delta data load 300 into a target table. As shown, the process commences at step 310. At step 320, the process generates a sub-dataset using the upsert key list. In one embodiment, the sub-dataset is generated by joining the record from the history table. At step 330, the sub-dataset is loaded into the target table. Once the sub-dataset is loaded, it is compared with the upsert key list. There may be records in the upsert key list but they do not exist in the sub-dataset. For example, inconsistent records may exist between the upsert key list and the sub-dataset. Inconsistent records indicate that these records were filtered out with current values and should not be put into the data model. Inconsistent records are deleted from the target table. At step 340, records are deleted from the target table based on the delete key list. At step 350, the process determines if all target tables have been loaded. If not all the target tables have been loaded, the process steps from 320 to 340 are repeated until all target tables have been loaded with sub-dataset. Once all target tables have been loaded, the process terminates at step 360.

Figure 4:
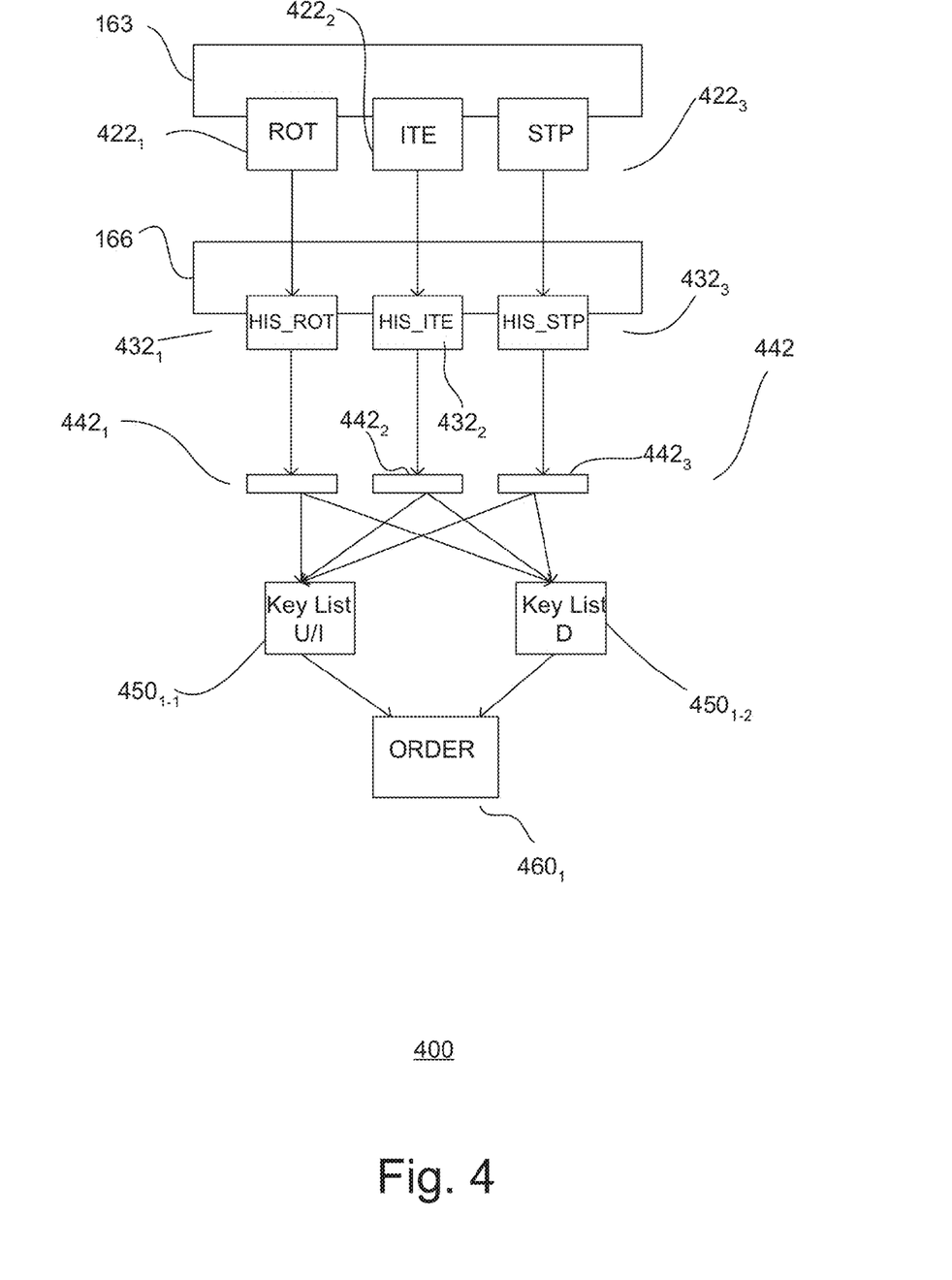
FIG. 4 illustrates an embodiment of a database layer.

FIG. 4 shows a simplified exemplary embodiment of a database layer 150 for illustrative purposes. As exemplified, the database layer includes a HANA database. The example may be applied to other types of databases. The database layer includes a RDS sub-module 163. The RDS sub-module, as shown, includes first, second and third history tables $422_{1\text{-}3}$. The first table is named ROT, the second table is named ITE and the third table is named STP. Other configurations or numbers of history tables may also be useful. The history tables, for example, correspond to physical tables ROT, ITE and STP in the user systems layer.

In the example, the PDM sub-module 170 includes a data model 460. The data model may be named ORDER. The data model, for example, is based on the 3 tables ROT, ITE and STP. In the model ORDER, ROT is a header table, ITE is an item table and STP is a reference table. The extract logic for the model ORDER may be as follows:

```
SELECT    ITEM.MANDT AS CLIENT,
          ITEM.DB_KEY AS ID,
          ITEM.SHIPPER_KEY AS SHIPPER_ID,
          ITEM.CONSIGNEE_KEY AS CONSIGNEE_ID,
          TO_TIMESTAMP(CAST(SRC_STOP.SEL_TIME    AS
   VARCHAR), 'YYYYMMDDHH24MISS')
   AS START_TIME,
          TO_TIMESTAMP(CAST(DES_STOP.SEL_TIME    AS
   VARCHAR),
   'YYYYMMDDHH24MISS')
   AS END_TIME,
          SRC_STOP.LOG_LOC_UUID AS SRC_LOC_ID,
          DES_STOP.LOG_LOC_UUID AS DES_LOC_ID,
          CASE
            WHEN ITEM.QUA_PCS_VAL > 0 THEN
          ITEM.QUA_PCS_VAL
            ELSE 1
          END AS QUA_PCS_VAL,
          ITEM.CONT_CNT_UNI AS CONT_CNT_UNI,
          CONCAT(CONCAT(ITEM.TURES_TCO,'_'),ITEM.
          TURES
   _CAT) AS CAT_ID,
   FROM ROT AS ROOT
   INNER JOIN ITE AS ITEM ON ROOT.MANDT = ITEM.MANDT
   AND ROOT.DB_KEY = ITEM.PARENT_KEY
   LEFT OUTER JOIN STP AS SRC_STOP ON ITEM.MANDT =
   SRC_STOP.MANDT
   AND ITEM.SRC_STOP_KEY = SRC_STOP.DB_KEY
   LEFT OUTER JOIN STP AS DES_STOP ON ITEM.MANDT =
   DES_STOP.MANDT
   AND ITEM.DES_STOP_KEY = DES_STOP.DB_KEY
   WHERE ROOT.TOR_CAT = 'TO'
   AND ITEM.ITEM_CAT = 'TUR'
   AND CONFIRMATION IN ('01','04','05')
   AND ITEM.MANDT = '350';
```

Based on the extract logic for model ORDER, the primary key is from the ITE table.

As discussed, the history tables may be initially provided into the RDS sub-module by replicating the source data tables ROT, ITE and STP from the user systems layer. The replicated tables are provided in the RDS sub-module by, for example, data services such as SLT. Other types of data services or combination of data services may be utilized to provide the replicated tables in the RDS sub-module. In one embodiment, after the source tables are replicated in the RDS sub-module, they are converted to history tables, such as history column tables.

In one embodiment, converting the replicated tables to history tables includes temporarily renaming the tables to temporary tables. History tables are created from the temporary tables. The temporary tables are dropped or deleted. The history tables are created from the replicated tables one at a time. The following is the exemplary history table creation code which may be used to create the ROT history table from the replicated ROT table in HANA:

```
RENAME TABLE "ROT" TO "TMP_ROT";
CREATE HISTORY COLUMN TABLE "ROT" LIKE "TMP_ROT" WITH DATA;
DROP TABLE "TMP_ROT";
```

Other processes may be employed to create or convert replicated source tables to history tables. During the creation or conversion process, the updating of the tables is suspended. The process is repeated until all history tables are created from the replicated source tables.

After the history tables are created, change list tables 432 are created in the LDS sub-module 166. For example, first, second and third change list tables $232_{1-2}$ corresponding to the ROT, ITE and STP history tables are created. The change list tables, for example, are named HIS_ROT, HIS_ITE and HIS_STP. Other naming conventions for the change list tables may also be useful. The change list table may be created using, for example, the history table creation routine already described. Other techniques for creating the change list table may also be useful.

As described, changes to the source tables in the user systems layers are permeated to the history tables. When a change occurs to a record in a source table, the corresponding record in the history table contained in the database layer is updated. The update indicates what the change and when the change was made.

Figure 5A:
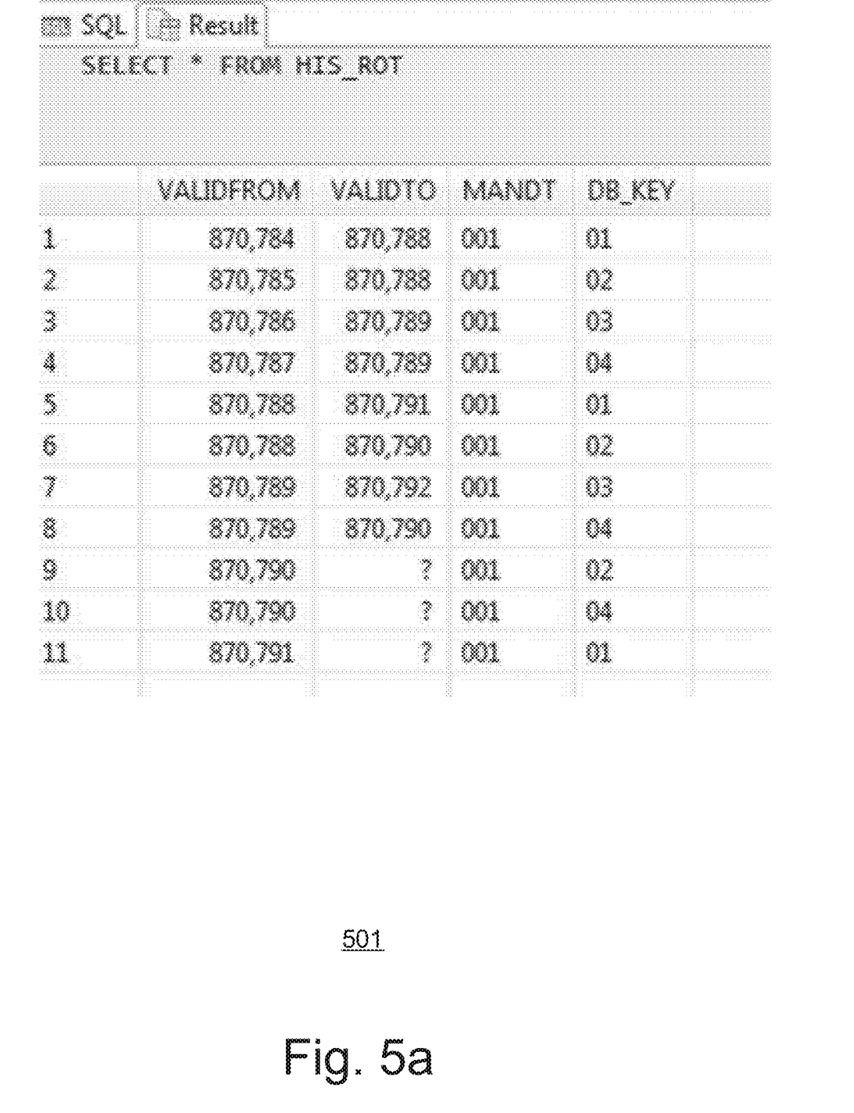
FIGS. 5a-c show exemplary change list table, upsert key list and delete key list.

When a delta data load is initiated, updating of the history records is suspended. The change list tables are cleared and changes since the last delta data load are inserted into the change list tables. As discussed, the update or data provision routine is performed one change list table at a time. For example, HIS_ROT table is updated, followed by HIS_ITE table and then followed by HIS_STP table. Other configurations of updating the change list tables may also be useful. The change list tables include the "valid to" attribute, "valid from" attribute and primary key. Providing other information in the change list tables may also be useful. FIG. 5a shows an exemplary change list table HIS_ROT 501 in which the commit id of the last delta data load is 870,783.

The change list tables are analyzed to generate delta summary tables 442. The delta data summary tables correspond to the change list tables. For example, first, second and third delta data summary tables $442_{1-3}$ are generated corresponding to HIS_ROT, HIS_ITE and HIS_STP. A delta data summary table includes change records in the delete (D), update (U) and insert (I) categories. The categories are based on the "value from" and "value to" attributes of a record. Records having a "valid from" value greater than that of the last delta data load and a non-null value for "valid to" attribute which is greater than the "valid from" attribute are categorized as deleted records. For records having a "valid to" value=null and "valid from" is ≤last delta data load, the records are categorized as U records; records having a "valid to" value=null and "valid from" is >last delta data load, the records are categorized as I records. Records in the D category are deleted, records in the U category are changed and records in the I category are inserted or created.

Based on the delta data summary tables, key lists are generated. In one embodiment, an upsert key list $450_{1-1}$ and a delete key list $450_{1-2}$ are generated for the data model $460_1$.

Figure 5B:
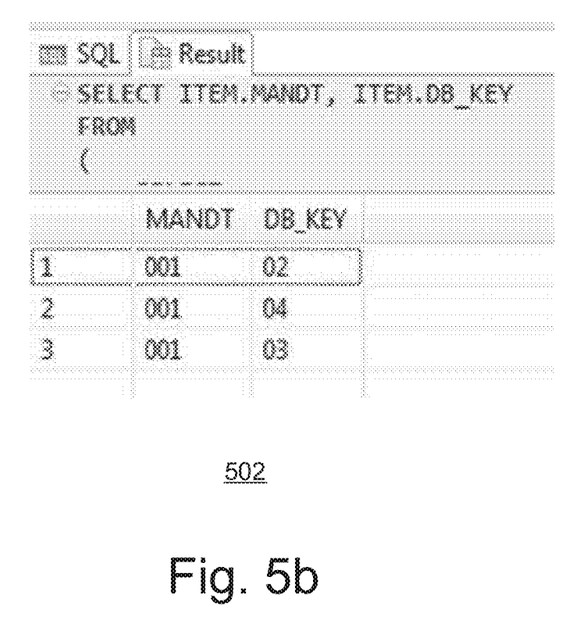
Figure 5C:
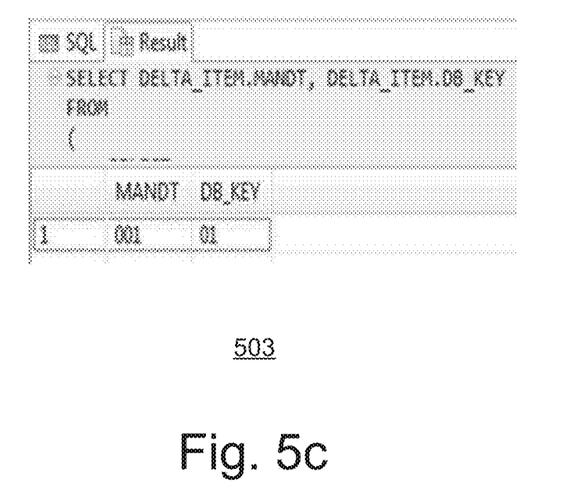

An upsert key list includes keys of I and U categories of delta items from the delta data summary tables corresponding to tables of the data model ORDER. For example, I and U categories of delta items from summary tables of HIS_TOT, HIS_ITE and HIS_STP are included. The keys of I and U categories of delta items are mapped to the keys of the corresponding data model. For example, keys from ROT, ITE and STP are mapped to the primary key of the model, which is from ITE. To avoid duplication, a union function is used to combine and map the tables to ITE to obtain the upsert key list. An exemplary summary of an upsert key list 502 is shown in FIG. 5b. As for the delete key list, it is obtained by combining the D category records of the delta data summary tables which contribute to the key list using a union function. In this case, the delete key list is obtained from the D category records of the delta data summary table for ITE. An exemplary summary of a delete key list 503 is shown in FIG. 5c.

The upsert key list is used to apply upsert delta data to the data model ORDER. For example, an UPSERT statement may be employed to apply the upsert delta data to the data model ORDER. An exemplary UPSERT statement for the model ORDER may be as follows:

```
UPSERT "ORDER"
  (CLIENT,ID,SHIPPER_ID,CONSIGNEE_ID,START_TIME,
  END_TIME,SRC_LOC_ID,DES_LOC_ID,CONT_CNT_UNI,
  CAT_ID)
  SELECT  ITEM.MANDT AS CLIENT,
          ITEM.DB_KEY AS ID,
          ITEM.SHIPPER_KEY AS SHIPPER_ID,
          ITEM.CONSIGNEE_KEY AS CONSIGNEE_ID,
          TO_TIMESTAMP(CAST(SRC_STOP.SEL_TIME AS
    VARCHAR), 'YYYYMMDDHH24MISS') AS START_TIME,
          TO_TIMESTAMP(CAST(DES_STOP.SEL_TIME AS
    VARCHAR), 'YYYYMMDDHH24MISS') AS END_TIME,
          SRC_STOP.LOG_LOC_UUID AS SRC_LOC_ID,
          DES_STOP.LOG_LOC_UUID AS DES_LOC_ID,
          CASE
             WHEN ITEM.QUA_PCS_VAL > 0 THEN
          ITEM.QUA_PCS_VAL
             ELSE 1
          END AS QUA_PCS_VAL,
          ITEM.CONT_CNT_UNI AS CONT_CNT_UNI,
          CONCAT(CONCAT(ITEM.TURES_TCO,'_'),ITEM.TURES
    _CAT) AS CAT_ID,
  FROM ROT AS ROOT
  INNER JOIN ITE AS ITEM ON ROOT.MANDT = ITEM.MANDT
  AND ROOT.DB_KEY = ITEM.PARENT_KEY
  INNER JOIN :UPSERT_KEY_LIST AS DELTA_KEYS
  ON ITEM.DB_KEY = DELTA_KEY.DB_KEY AND ITEM.MANDT =
  DELTA_KEY.MANDT
  LEFT OUTER JOIN STP AS SRC_STOP ON ITEM.MANDT =
SRC_STOP.MANDT
    AND ITEM.SRC_STOP_KEY = SRC_STOP.DB_KEY
    LEFT OUTER JOIN STP AS DES_STOP ON ITEM.MANDT =
DES_STOP.MANDT
    AND ITEM.DES_STOP_KEY = DES_STOP.DB_KEY
    WHERE ROOT.TOR_CAT = 'TO'
      AND ITEM.ITEM_CAT = 'TUR'
      AND CONFIRMATION IN ('01','04','05')
      AND ITEM.MANDT = '350';
```

After performing the UPSERT function, some inconsistent records which, for example, have been filtered out or do not satisfy the join conditions of the UPSERT function, are deleted. Inconsistent records, for example, may be flagged by an EXCEPT keyword. An exemplary DELETE statement for inconsistent records may be as follows:

```
DELETE FROM "ORDER" AS T1
WHERE EXISTS (
```

-continued

```
SELECT 1 FROM (
    SELECT ITEM.MANDT, ITEM.DB_KEY
      FROM :UPSERT_KEY_LIST
    EXCEPT
    SELECT ITEM.MANDT AS CLIENT,
      CAST(ITEM.DB_KEY AS VARCHAR) AS ID
    FROM "ROT" AS ROOT
    INNER JOIN "ITE" AS ITEM ON ROOT.MANDT = ITEM.MANDT
    AND ROOT.DB_KEY = ITEM.PARENT_KEY
    INNER JOIN :UPSERT_KEY_LIST AS DELTA_KEY
    ON ITEM.DB_KEY = DELTA_KEY.DB_KEY AND ITEM.MANDT =
  DELTA_KEY.MANDT
    LEFT OUTER JOIN "STP"AS SRC_STOP ON ITEM.MANDT =
  SRC_STOP.MANDT
    AND ITEM.SRC_STOP_KEY = SRC_STOP.DB_KEY
    LEFT OUTER JOIN "STP" AS DES_STOP ON ITEM.MANDT =
  DES_STOP.MANDT
    AND ITEM.DES_STOP_KEY = DES_STOP.DB_KEY
    WHERE ROOT.TOR_CAT = 'TO'
      AND ITEM.ITEM_CAT = 'TUR'
      AND CONFIRMATION IN ('01','04','05')
      AND ITEM.MANDT = '350')
WHERE MANDT = T1.CLIENT AND DB_KEY = T1.ID
);
```

After delta data of the upsert key list are applied to the data model ORDER, the delta data of the delete key list are applied. For example, D category records from ITE summary table are applied to the data model ORDER. The DELETE statement for the delete key list may be as follows:

```
DELETE FROM TAM_DEV.CONTAINER_ORDER AS T1
WHERE EXISTS (
  SELECT 1 FROM (
    SELECT DELTA_ITEM.MANDT, DELTA_ITEM.DB_KEY
      FROM :DELETE_KEY_LIST AS DELTA_ITEM
      WHERE DELTA_ITEM.FLAG IN ('D')
) AS T2
WHERE T2.MANDT = T1.CLIENT AND T2.DB_KEY = T1.ID
);
```

Although as described, upsert key list is processed before the delete key list, it is understood that other configurations of processing the key lists may also be useful.

As described, the database layer may be embodied as an application. For example, the database layer may be embodied as a software application. The source code of the application may be compiled to create an executable code. The codes, for example, may be stored in a storage medium, such as one or more storage disks. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method comprising:
    replicating by a computer, physical tables from a data source to form replicated physical tables;
    converting ,by the computer, the replicated physical tables to history tables, wherein the history tables log changes to the physical tables;
    providing, by the computer, a physical data model, wherein the physical data model is based on at least one physical table;
    in response to initiating a data load, generating, by the computer, change list tables corresponding to the history tables, wherein the change list tables contain changes of the corresponding history tables since a last delta data load;
    generating, by the computer, delta data summary tables corresponding to the change list tables by analyzing the change list tables;
    generating, by the computer, key lists from the delta data summary tables for updating the physical data model; and
    updating by the computer, changes since the last delta data load in the physical data model.

2. The computer-implemented method of claim 1 wherein replicating the physical tables comprises a data service.

3. The computer-implemented method of claim 1 wherein changes to the physical tables in the data source are logged in the corresponding history tables using a data service.

4. The computer-implemented method of claim 1 wherein the history tables have same structure as the physical tables.

5. The computer-implemented method of claim 4 wherein records of history tables include valid to and valid from attributes.

6. The computer-implemented method of claim 5 wherein the change list tables comprise history records of the corresponding history tables having valid from attribute or valid to attribute with commit id greater than commit id of the last delta data load.

7. The computer-implemented method of claim 6 wherein analyzing the change list tables to form the delta data summary tables corresponding to the change list tables comprises forming the, delta data summary tables containing delta data records, wherein the delta data records include any combination of update records, insert records and delete records, wherein
    update records are records with valid from attribute having commit id less than commit id of the last delta data load and null valid to attribute,
    insert records are records with valid from attribute having commit id greater than commit id of the last delta data load and null valid to attribute, and
    delete records are records with valid to attribute with non-null commit id which is greater than commit id of the valid from attribute.

8. The computer-implemented method of claim 7 comprising generating an upsert key list and a delete key list for the data model, wherein:
    the upsert key list contains a union of update and insert delta records from the delta data summary tables corresponding to tables of the physical data model; and
    the delete key list contains a union of delete delta records from the delta data summary tables corresponding to tables of the physical data model which contribute primary keys to the physical data model.

9. The computer-implemented method of claim 8 wherein updating changes comprises:
    updating and inserting records in the physical data model based on the upsert key list; and
    deleting records in the physical data model based on the delete key list.

10. The computer-implemented method of claim 8 wherein updating changes comprises:
    generating sub-dataset using the upsert key list;
    applying the sub-dataset to the physical data model based on the upsert key list;

deleting records from the physical data model which exist in the upsert key list but do not exist in the sub-dataset; and deleting records in the physical data model based on the delete key list.

11. The computer-implemented method of claim 1 wherein providing a physical data model comprises providing a plurality of physical data models, wherein the physical data models are based on one or more physical tables in the data source.

12. The computer-implemented method of claim 10 wherein the upsert key list is processed before the delete key list.

13. The computer-implemented method of claim 5 wherein the valid from attribute comprises a commit id of when its corresponding history record is entered into a history table and the valid to attribute comprises a commit id of when the corresponding history record is no longer valid.

14. The computer-implemented method of claim 13 wherein the commit id is equivalent to a time stamp.

15. The computer-implemented method of claim 14 wherein the commit id is stored in a configuration file.

16. A non-transitory computer-readable medium having stored thereon program code, the program code executable by a computer to:

generate change list tables from history tables which correspond to physical tables from a data source when a delta load is initiated;

analyze the change list tables to form delta data summary tables from the change list tables;

generate, from the delta data summary tables, key lists corresponding to delta data; and apply the delta data based on the generated key lists to a physical data model, the physical data model is based on one or more physical tables from the data source.

17. The non-transitory computer-readable medium of claim 16 wherein the key lists comprises an upsert key list and a delete key list corresponding to the delta data.

18. A database system comprising:

a non-transitory memory for storing computer readable program code, a raw data schema, the raw data schema containing history tables, the history tables containing change log history of data tables of a user system, a log data schema configured to contain change list tables, and a physical data model schema containing at least one physical data model based on at least some of the data tables of the user system; and a processor in communication with the memory, the processor being operative with the computer readable program code to perform steps including generating the change list tables corresponding to the history tables, wherein the change list tables contain changes of the corresponding history tables since a last delta data load when a data load is initiated, generating delta data summary tables corresponding to the change list tables by analyzing the change list tables, generating key lists from the delta data summary tables for updating the physical data model, and updating changes since the last delta data load in the physical data model.

19. The database system of claim 18 wherein the user system provides layers of software that serve as source data for the raw data schema.

* * * * *